United States Patent [19]

Pinna

[11] 3,745,989

[45] July 17, 1973

[54] DEVICE FOR LOCATING VEINS IN LIVING BODIES

[76] Inventor: Sanford Pinna, 500 68th Avenue South, St. Petersburg, Fla.

[22] Filed: Apr. 26, 1972

[21] Appl. No.: 247,781

[52] U.S. Cl. ............... 128/2 R, 73/81, 128/2 T, 128/2.05 N, 128/2 N, 128/205 E
[51] Int. Cl. ............................................. A61b 5/00
[58] Field of Search ............... 128/2.05 P, 2.05 S, 128/205 T, 2 S, N; 73/80, 87, 85

[56] References Cited
UNITED STATES PATENTS

| | | | |
|---|---|---|---|
| 749,854 | 1/1904 | Fahrney | 128/2.05 P |
| 2,421,449 | 6/1947 | Zuber | 73/81 |
| 2,704,539 | 3/1955 | Fisher | 128/2 N |
| 2,708,928 | 5/1955 | Zenatti | 128/2.05 N |
| 3,078,710 | 2/1963 | Palmer | 73/81 |
| 3,308,653 | 3/1967 | Roth | 128/2 T |
| 3,693,418 | 9/1972 | Kaspareck | 73/85 |
| 3,704,704 | 12/1972 | Iberall | 128/2.05 E |

*Primary Examiner*—Aldrich F. Medbery
*Attorney*—Mason, Fenwick & Lawrence

[57] ABSTRACT

A casing is provided with an elongated sensor rod and a marking rod mounted for axial reciprocation by a motor driven cam through compression springs so that the sensor is moved outwardly of the casing by a constant force with the end of the sensor engaging a living body so that the distance of outward movement depends on the resistance of the body, a latch release lug extends from the sensor to release a spring urged marking rod for outward movement to mark the surface of the body in response to movement of the sensor rod beyond a given position in response to lessened resistance to outward movement of the sensor occasioned by a vein positioned beneath the sensor.

10 Claims, 6 Drawing Figures

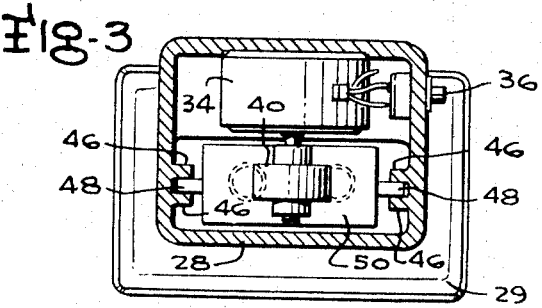
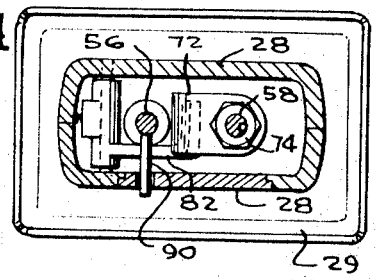
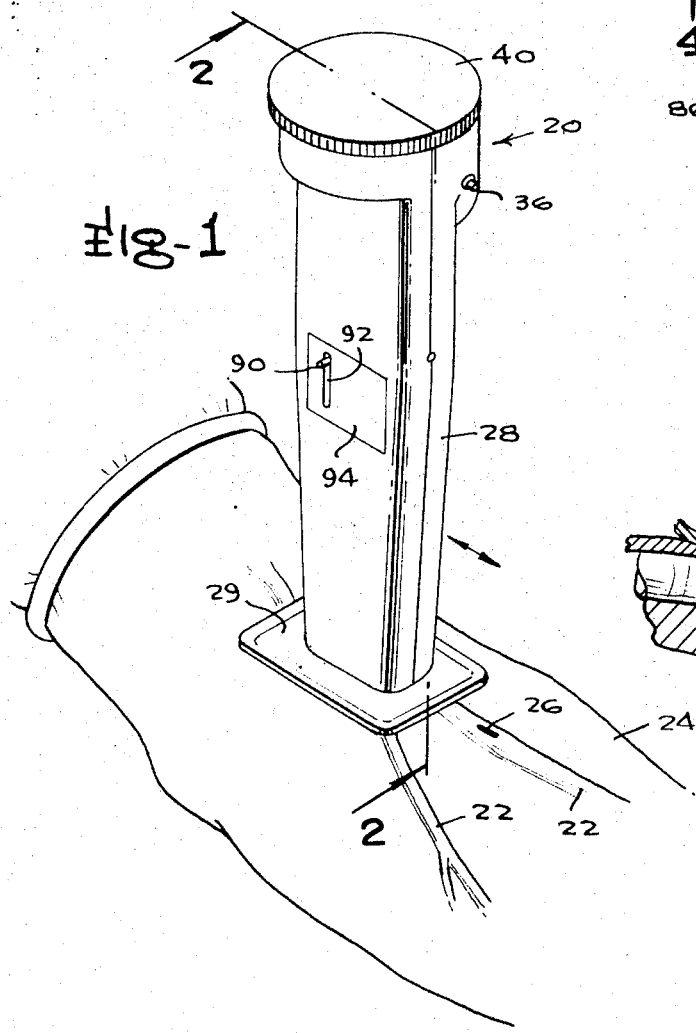
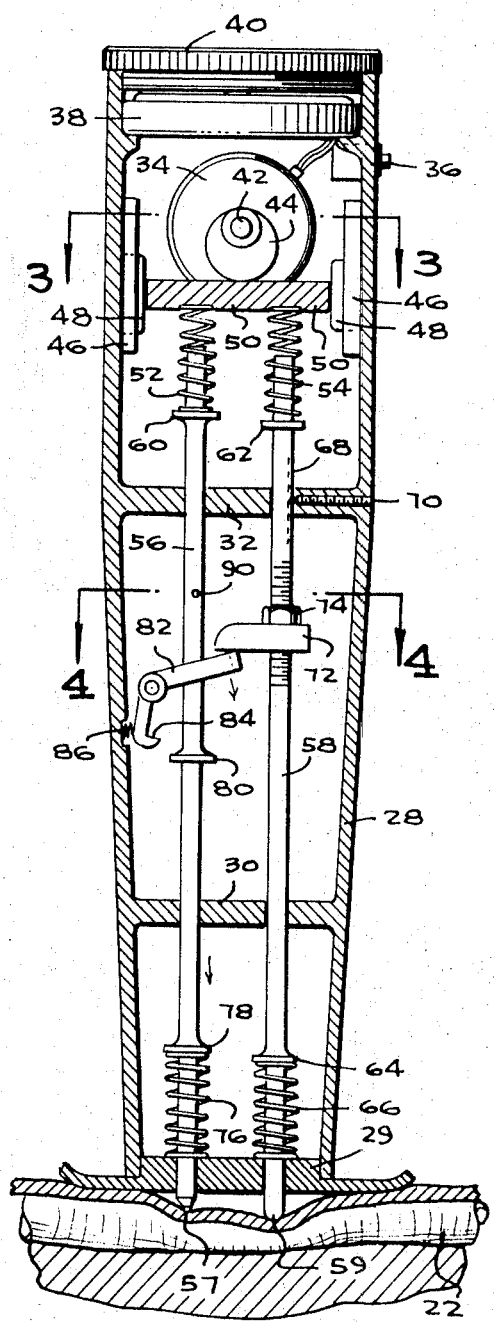

DEVICE FOR LOCATING VEINS IN LIVING BODIES

This invention is in the field of surgical implements and the like, and is specifically directed to a uniquely simple, yet effective, means for detecting the location of a vein in a living body.

Various medical procedures require determination of the exact location of a vein beneath the surface of the skin of a living body, and such detection is frequently difficult or impossible to make visually. Consequently, a hit or miss approach by insertion of a needle into the body is frequently resorted to, to the consequent discomforture of the patient. Moreover, and even more seriously, delays in locating a vein can, in some instances, have disastrous and possible fatal medical effects.

The foregoing problems have been recognized by those of skill in the art, and a number of devices have been proposed for aiding in the solution thereof. For example, U. S. Pat. No. 3,556,079 discloses a complicated apparatus and method of operation employing ultrasonic means for detecting a vein. Other devices have also been proposed; however, such devices have met with only limited success and have frequently involved highly sophisticated and consequently expensive apparatus which must of necessity be employed in a hospital or other fixed location.

Consequently, up until the time of the present invention there had been an unmet need for a simple, reliable and economical means of accurately detecting the position of a vein in a living body.

It is consequently the primary objection of this invention to provide a new and improved means for detecting veins in living bodies.

The obtainment of the object of this invention is enabled through the provision of a casing in which a sensor member in the form of an elongated rod is mounted for axial reciprocation. In addition, an elongated marking rod having a marker containing ink or the like on one end is also mounted for axial reciprocation in the casing with the two rod members being substantially close to each other and in parallel orientation. An electric motor drives an eccentric cam engageable with a floating bearing plate with a compression spring extending between the bearing plate and the sensor rod member, so that reciprocating motion of the bearing plate causes the compression spring to compress and consequently urge the sensor rod outwardly with respect to the casing.

When the end of the sensor rod is positioned against the skin of a living body, the depth to which the sensor rod will move into and toward the body, without penetrating the skin, is in accordance with the softness of the body beneath the skin in the location of the sensor rod. If a vein is positioned beneath the end of the sensor rod, the rod will move outwardly a greater distance than it will if there is no vein beneath the end of the sensor rod. Consequently, such outward movement of a substantial distance is indicative that a vein is positioned beneath the end of the sensor rod.

The marking rod is normally retained within the casing by means of a pivotal latch member. However, a latch release lug extends from the sensor rod and serves to engage the latch member to release the marking rod upon movement of the sensor rod to its outer-most position to mark the skin adjacent the end of the marking rod. Unlatching of the marking rod occurs only in response to the movement of the sensor rod to its outer-most position as occurs when the sensor rod is located in alignment with a vein. Consequently, the markings of the skin of the body provides a clear indication of the position of the vein.

A better understanding of the subject invention will be achieved when the following written description is read in conjunction with the appended drawings in which:

FIG. 1 is a perspective view illustrating the manner of use of the preferred embodiment;

FIG. 2 is a sectional view taken along lines 2—2 of FIG. 1;

FIG. 3 is a sectional view taken along lines 3—3 of FIG. 2;

FIG. 4 is a sectional view taken along lines 4—4 of FIG. 2;

Figure 5:
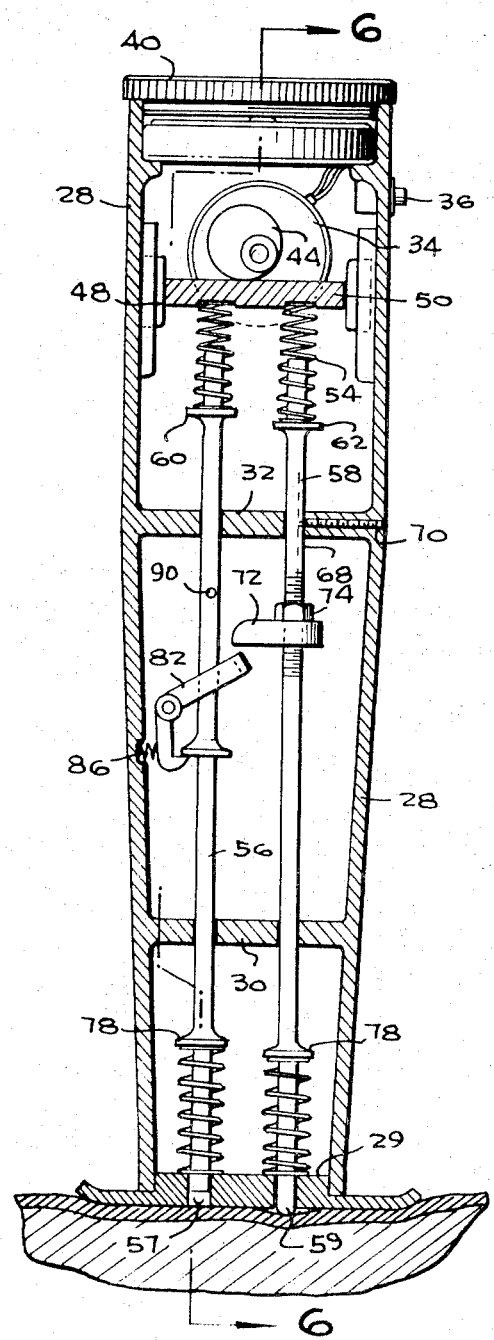
FIG. 5 is a sectional view taken along the same lines as FIG. 2 but illustrating the parts in a different operative position.
Figure 6:
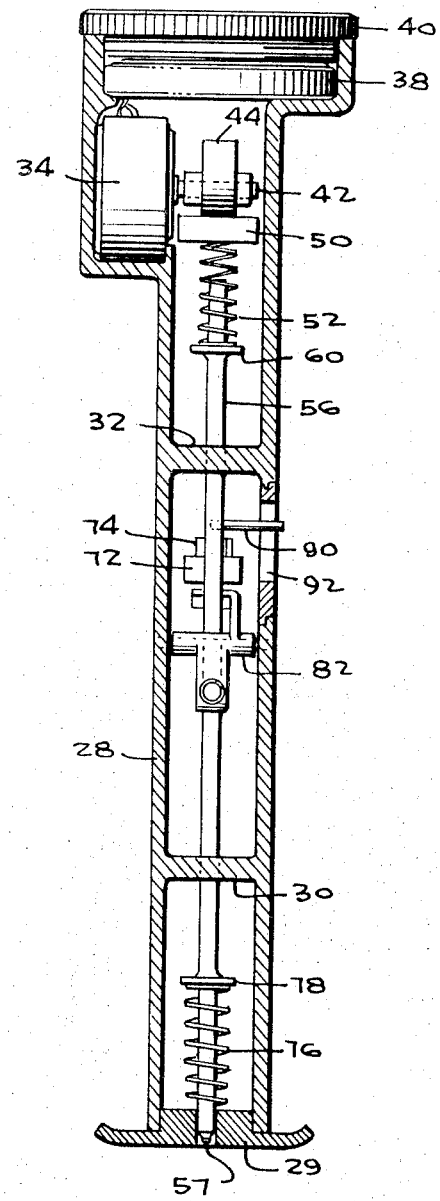
FIG. 6 is a sectional view taken along lines 6—6 of FIG. 5.

Attention is initially invited to FIG. 1 of the drawings which illustrates the preferred embodiment of the invention 20 in use in conjunction with a human arm 24 for detecting veins 22 in the arm. The device provides a mark 26 in alignment with a detected vein.

A two-part split casing member 28 of elongated, generally rectangular configuration encloses and supports the working components of the preferred embodiment with the casing including a base plate 29, a lower apertured guide web 30 and an upper guide web 32 which also includes appertures.

The upper end of the casing 28 is enlarged and is of adequate cross sectional area to enclose an electric motor 34 fixed to the casing and connected in series with a push button switch 36 and a battery 38. Access to battery 38 is provided by means of a removable end cap 40 threadably received in the upper end of casing 38. Electric motor 34 is provided with an output shaft 42 to which an eccentric cam 44 is connected.

Slide bearing lugs 46 extend endwardly from the walls of the casing 28 on opposite sides of the casing to define a guide slot on opposite sides of the casing in which a pair of slide members 48 are positioned. These components are best shown in FIGS. 2 and 3. Slide members 48 are connected to a floating cam follower plate 50 which is consequently guided for reciprocating up and down movement in an obvious manner.

Floating cam follower plate 50 engages the eccentric cam 44 and is urged upwardly by first and second compression springs 52 and 54 which extend from the lower surface of the cam follower plate 50 and respectively have their lower ends encircling a marking rod 56 and a sensor rod 58 having a lower rounded end tip portion 59. Marking rod 56 is provided with a radial flange 60 and the sensor rod 58 is provided with a radial flange 62 with both of the radial flanges serving to retain the springs 52 and 54 in position so that rods 56 and 58 are both continuously urged downwardly by their respective compression springs with which they are engaged. In addition, marking rod 56 includes an ink impregnated tip pad on the like 57 on its lower end for applying a mark 26 (FIG. 1) to the skin surface.

Sensor rod 58 is supported in the upper and lower guide webs 32 and 30 and base plate 29 for axial reciprocation as shown in FIG. 2 and includes a lower radial flange 64. A sensor rod return spring 66 extends between the base plate 29 and the lower radial flange 64 for urging the sensor rod upwardly in an obvious manner. Therefore, it will be seen that the compression spring 54 urges the sensor rod 58 downwardly while the compression spring 66 urges the sensor rod upwardly. Springs 52 and 54 are of insufficient strength to overcome the force of spring 66 and a marking rod return spring 76 respectively, when follower plate 50 is in its uppermost position; however, movement of plate 50 to its lowermost position compresses springs 52 and 54 so that the downward force exerted by springs 52 and 54 exceeds the upward force of springs 76 and 66 respectively.

A slot 68 is provided along the length of an upper portion of the sensor rod with the end of a set or guide screw member 70 extending into the slot to prevent rotation of the rod 58 while permitting axial reciprocation of the rod caused by up and down movement of the floating cam foller plate 50. It should be noted that the downward movement of the rod is provided by a substantial urging force from the compression spring 54.

A latch release lug 72 extends radially outward from the sensor rod 58 and is internally threaded to be vertically adjustable with respect to the rod with final positioning on rod 58 being retained by means of a lock nut 74.

Marking rod 56 is also mounted for reciprocating vertical movement by virtue of the fact that it extends through apertures in the upper web 32, the lower web 30, and the base plate 29. Similarly, the marking rod also includes the marking rod return spring 76 compressed between a lower flange 78 and the base plate 29. A centrally located latch flange 80 is provided on the marking rod 56 and a latch member 82 in the form of a pivotal bell crank is provided with a latching surface 84 movable into position beneath the latch flange 80 as shown in FIG. 5. When the latch 82 is positioned as shown in FIG. 5, the marking rod 56 is retained in its upper position with the marking means 57 inside the casing. However, the latch release lug 72 engages the latch member 82 when the sensor rod 58 is moved downwardly a substantial distance so that the marking rod 56 is free to move outwardly of the base plate 29 under the urging of spring 52 to mark the surface of the body beneath the marking rod.

A small coiled compression spring 86 normally biases the latch member 82 in a counter clockwise direction as will be evident from inspection of FIGS. 2 and 5 for example.

A manual return pin 90 extends radially from the marking rod 56 outwardly through a slot 92 in an access plate 94 in the casing 28 for enabling a manual return of the marking rod to its upper latched position.

A complete cycle of operation will now be discussed with initial reference being made to FIG. 5. In FIG. 5, the component parts are in their initial positions with the marking rod 56 being held in its retracted latched position by means of the latch member 82.

Closure of the push button switch 36 actuates the electric motor 34 to rotate the eccentric cam member 44 in an obvious manner. This rotation of the eccentric cam member 44 results in an up and down reciprocation of the floating cam follower plate 50 which provides a downward force against the upper ends of the compression springs 52 and 54. The maximum downward force on the sensor rod 58 is determined by the strength of the compression spring 54.

The downward force exerted on the sensor rod 58 is resisted by the body positioned adjacent the base plate 29 with the resistance of the body determining the extent of outward movement of the rounded tip 59 of the sensor rod 58. The absence of a vein beneath the rounded tip 59 results in an increased resistance to outward movement of the tip 59 and rod 58 and the consequent downward movement of the rod is restricted to such an extent that the latch release lug 72 does not move downwardly a sufficient distance to engage and release latch 82. However, when a vein 22 is positioned beneath the rounded end 59, the sensor rod would move outwardly a substantial distance in the manner illustrated in FIG. 2 due to the decreased resistance to such outward movement which is in turn due to the fact that a vein produces less resistance to movement of rod 58.

When rod 59 moves outward the greater distance illustrated in FIG. 2, the latch release lug 72 engages one arm of the latch member 82 to pivot the latch member in a clockwise direction to release the marking rod 56 so that it is moved forcefully downwardly by the compression spring 52. The marking means 57 moves outwardly of the base plate 29 and engages the skin and applies a mark 26 in the manner illustrated in FIG. 1. The position of mark 26 is indicative of the positioning of a vein beneath the mark since the rod 56 and the rod 58 are closely spaced adjacent to each other and the casing 28 is oriented so that the two rod members are in general alignment with the direction of vein orientation in the body.

Therefore, it will be seen that the positioning of a vein 22 beneath the rounded tip 59 enables the sensor rod 58 to move outwardly a greater distance than is the case when no vein is beneath the tip 59. Consequently, latch 82 is actuated to release the marking rod 56 to provide a consequent indication of the position of the vein beneath the surface of the skin.

Following detection of a vein and release of the marking rod 56, the marking rod 56 is then returned to its latched position illustrated in FIG. 5 by means of an upward movement of the manual return rod 90 in an obvious manner, or by the function of return spring 76 when plate 50 moves to its upper position.

It should be appreciated that the sensitivity of the device can be adjusted by varying the position of the latch release lug 72 upwardly and downwardly along the sensor rod 58. Consequently, the parts can be returned to their original positions by springs 76 and 66 or manually by means of manual return rod 90.

It will be obvious that other variations of the subject invention will occur to those of skill in the art. For example, auditory means, such as a buzzer could be provided for providing an audible signal in response to the detection of a vein by rod 58 and it would also be possible to provide a light or other viable indicator. In addition, the invention is not restricted to the employment of an electric motor since it would also be possible to use a mechanical motor or other force providing means for urging the sensor rod 58 downwardly.

Therefore, the spirit and scope of the invention is to be limited solely by the appended claims.

I claim:

1. A device for locating veins in a living body comprising a casing, a sensor member mounted for movement outwardly of said casing adjacent one end of said casing, force exerting means for exerting a predetermined force on said sensor member urging said sensor member outwardly from said casing a given distance against the resistance of a living body with which the sensor is engaged when there is no vein beneath the sensor but will move outwardly a greater distance when there is a vein beneath the sensor and position identifying means responsive to movement of said sensor said greater distance to provide an indication and identification of such movement and position for apprising the user of the presence of a vein beneath the sensor.

2. The invention of claim 1 wherein said sensor member comprises an elongated rod.

3. The invention of claim 2 wherein said position identifying means comprises marking means for placing a visible mark on said living body at a location adjacent the location at which the elongated rod engages said body in response to movement of said elongated rod said greater distance.

4. The invention of claim 3 wherein said force exerting means includes a motor driven cam engaging force transmission means connected to said elongated rod.

5. The invention of claim 4 wherein said force transmission means includes a cam follower plate mounted for reciprocation and a compression spring extending between said cam follower plate and said elongated rod.

6. The invention of claim 5 wherein said marking means comprises a marking element normally retained in a retracted position in said casing, marking spring means urging said marking element in a direction outwardly of said casing toward an extended position, latch means for holding said marking element in said retracted position and additionally including a latch release member carried by said elongated rod and engageable with said latch upon movement of said elongated rod said greater distance to consequently permit said marking means to move outwardly to its extended position to consequently place a mark on said body.

7. The invention of claim 6 additionally including a return spring engaging said elongated rod for urging said elongated rod inwardly of said casing.

8. The invention of claim 7 additionally including a marker return spring engaging said marking member and urging said marking member toward its retracted position.

9. The invention of claim 8 wherein said cam is driven by an electric motor.

10. The invention of claim 9 wherein said latch is a pivotally mounted bell-crank and said latch release member is a lug extending transversely from said elongated rod for engagement with one arm said of said bell crank.

* * * * *